United States Patent
Yoon et al.

(10) Patent No.: US 7,879,485 B2
(45) Date of Patent: Feb. 1, 2011

(54) HOUSING MEMBER FOR BATTERY MODULE

(75) Inventors: Junill Yoon, Seoul (KR); Jong-yul Ro, Seoul (KR); Yeo Won Yoon, Daejeon (KR); Heekook Yang, Daejeong (KR); Jaesung Ahn, Busan (KR)

(73) Assignee: LG Chem, Ltd. (KR)

( * ) Notice: Subject to any disclaimer, the term of this patent is extended or adjusted under 35 U.S.C. 154(b) by 646 days.

(21) Appl. No.: 11/407,157

(22) Filed: Apr. 19, 2006

(65) Prior Publication Data

US 2006/0251960 A1 Nov. 9, 2006

(30) Foreign Application Priority Data

Apr. 20, 2005 (KR) .................. 10-2005-0032933

(51) Int. Cl.
- H01M 2/00 (2006.01)
- H01M 2/26 (2006.01)
- H01M 2/02 (2006.01)

(52) U.S. Cl. .................. 429/128; 429/122; 429/161; 429/163; 429/178

(58) Field of Classification Search .................. 429/62, 429/65–66, 120, 148–149, 158–161; 439/522, 439/762–763; 320/107, 110, 116; 29/623.1–623.5
See application file for complete search history.

(56) References Cited

U.S. PATENT DOCUMENTS

| | | | |
|---|---|---|---|
| 2,273,244 A | 2/1942 | Ambruster | |
| 3,503,558 A | 3/1970 | Galiulo et al. | |
| 3,522,100 A | 7/1970 | Lindstrom | |
| 4,396,689 A | 8/1983 | Grimes et al. | |
| 5,071,652 A | 12/1991 | Jones et al. | |
| 5,270,131 A | 12/1993 | Diethelm et al. | |

(Continued)

FOREIGN PATENT DOCUMENTS

CN 1512518 A 7/2004

(Continued)

OTHER PUBLICATIONS

Chinese Office Action dated Dec. 7, 2007 for Chinese Patent Application No. 200480025941.5 (PCT/KR2004/002399).

(Continued)

*Primary Examiner*—Dah-Wei D Yuan
*Assistant Examiner*—Claire L Rademaker
(74) *Attorney, Agent, or Firm*—Cantor Colburn LLP

(57) ABSTRACT

Disclosed herein is a housing member for a battery module, which is mounted to at least one side of the battery module such that a flow channel of refrigerant is defined in the battery module having unit cells stacked therein, wherein the housing member is provided with electrically connecting members for electrically connecting electrode terminals of the unit cells with each other and/or electrically connecting an external device to the electrode terminals, the electrically connecting members being integrally formed at the housing member. The housing member according to the present invention is manufactured in a structure in which the electrically connecting members are integrally formed at the housing member. Consequently, the manufacturing costs of the housing member are reduced. Furthermore, the assembly process of the battery module is greatly simplified, and the occurrence of short circuits caused by an engineer's mistake is effectively prevented.

11 Claims, 8 Drawing Sheets

U.S. PATENT DOCUMENTS

| | | | |
|---|---|---|---|
| 5,346,786 A | 9/1994 | Hodgetts | |
| 5,354,630 A | 10/1994 | Earl et al. | |
| 5,364,711 A | 11/1994 | Yamada et al. | |
| 5,385,793 A | 1/1995 | Tiedemann et al. | |
| 5,487,955 A | 1/1996 | Korall et al. | |
| 5,487,958 A | 1/1996 | Tura | |
| 5,510,203 A | 4/1996 | Hamada et al. | |
| 5,520,976 A | 5/1996 | Giannetti et al. | |
| 5,561,005 A | 10/1996 | Omaru et al. | |
| 5,585,204 A * | 12/1996 | Oshida et al. | 429/62 |
| 5,589,290 A | 12/1996 | Klink et al. | |
| 5,639,571 A | 6/1997 | Waters et al. | |
| 5,645,448 A * | 7/1997 | Hill | 439/522 |
| 5,663,007 A | 9/1997 | Ikoma et al. | |
| 5,693,432 A | 12/1997 | Matsumoto | |
| 5,756,227 A | 5/1998 | Suzuki et al. | |
| 5,985,480 A * | 11/1999 | Sato et al. | 429/65 |
| 6,099,986 A | 8/2000 | Gauthier et al. | |
| 6,117,584 A | 9/2000 | Hoffman et al. | |
| 6,121,752 A | 9/2000 | Kitahara et al. | |
| 6,257,328 B1 | 7/2001 | Fujiwara et al. | |
| 6,275,003 B1 * | 8/2001 | Marukawa et al. | 320/116 |
| 6,406,812 B1 | 6/2002 | Dreulle et al. | |
| 6,411,063 B1 | 6/2002 | Kouzu et al. | |
| 6,413,678 B1 | 7/2002 | Hamamoto et al. | |
| 6,422,027 B1 | 7/2002 | Coates, Jr. et al. | |
| 6,448,741 B1 | 9/2002 | Inui et al. | |
| 6,462,949 B1 | 10/2002 | Parish, IV et al. | |
| 6,475,659 B1 | 11/2002 | Heimer | |
| 6,709,783 B2 | 3/2004 | Ogata et al. | |
| 6,771,502 B2 | 8/2004 | Getz, Jr. et al. | |
| 6,780,538 B2 | 8/2004 | Hamada et al. | |
| 6,821,671 B2 | 11/2004 | Hinton et al. | |
| 6,886,249 B2 | 5/2005 | Smalc | |
| 6,982,131 B1 | 1/2006 | Hamada et al. | |
| 7,026,073 B2 | 4/2006 | Ueda et al. | |
| 7,147,045 B2 | 12/2006 | Quisenberry et al. | |
| 7,229,327 B2 | 6/2007 | Zhao et al. | |
| 7,251,889 B2 | 8/2007 | Kroliczek et al. | |
| 7,264,902 B2 | 9/2007 | Horie et al. | |
| 7,479,758 B2 | 1/2009 | Moon | |
| 2001/0046624 A1 | 11/2001 | Goto et al. | |
| 2003/0082440 A1 | 5/2003 | Mrotek et al. | |
| 2004/0021442 A1 | 2/2004 | Higashino | |
| 2005/0026014 A1 | 2/2005 | Fogaing et al. | |
| 2005/0134038 A1 | 6/2005 | Walsh | |
| 2007/0037051 A1 | 2/2007 | Kim et al. | |
| 2007/0087266 A1 | 4/2007 | Bourke et al. | |
| 2007/0126396 A1 | 6/2007 | Yang | |
| 2009/0029239 A1 | 1/2009 | Koetting et al. | |
| 2009/0116124 A1 | 5/2009 | Minefuji | |
| 2009/0186265 A1 | 7/2009 | Koetting et al. | |
| 2009/0325051 A1 | 12/2009 | Niedzwiecki et al. | |
| 2009/0325052 A1 | 12/2009 | Koetting et al. | |
| 2009/0325053 A1 | 12/2009 | Koetting et al. | |
| 2009/0325054 A1 | 12/2009 | Payne et al. | |
| 2009/0325055 A1 | 12/2009 | Koetting et al. | |
| 2009/0325059 A1 | 12/2009 | Niedzwiecki et al. | |
| 2010/0086842 A1 | 4/2010 | Yang | |

FOREIGN PATENT DOCUMENTS

| | | |
|---|---|---|
| EP | 0736226 B1 | 3/1999 |
| EP | 0673553 B1 | 2/2001 |
| EP | 1435675 A1 | 7/2004 |
| JP | 4056079 A | 2/1992 |
| JP | 8138735 A | 5/1996 |
| JP | 8222280 A | 8/1996 |
| JP | 9129213 A | 5/1997 |
| JP | 09-219213 A | 8/1997 |
| JP | 10199510 A | 7/1998 |
| JP | 1166949 A | 3/1999 |
| JP | 11191432 A | 7/1999 |
| JP | 2003219572 A | 7/2003 |
| JP | 2003249205 A | 9/2003 |
| JP | 2005-126315 A | 5/2005 |
| JP | 2008-080995 A | 4/2008 |
| KR | 10-2005-0036751 | 4/2005 |
| KR | 10-2006-0036694 | 5/2006 |
| KR | 10-2006-0047061 | 5/2006 |
| KR | 100765659 B1 | 10/2007 |
| KR | 100889241 B1 | 4/2008 |
| KR | 20080047641 A | 5/2008 |
| KR | 100921346 B1 | 10/2009 |
| WO | WO03/071616 A2 | 8/2003 |

OTHER PUBLICATIONS

European Supplementary Search Report dated Aug. 28, 2009 for EP Application No. 04774658.
International Search Report for International application No. PCT/KR2005/003755 dated Mar. 2, 2006.
International Search Report for International application No. PCT/KR2006/001292 dated Jun. 29, 2006.
International Search report for PCT/KR2009/003434 dated Jan. 18, 2010.
Machine translation of JP 08-138735, May 24, 2010.
Machine translation of JP 10-199510, May 24, 2010.
Machine translation of JP 2000 260469, May 24, 2010.

* cited by examiner

HOUSING MEMBER FOR BATTERY MODULE

FIELD OF THE INVENTION

The present invention relates to a housing member for a battery module, and, more particularly, to a housing member for a battery module, which is mounted to at least one side of the battery module such that a flow channel of refrigerant is defined in the battery module having unit cells stacked therein, wherein the housing member is provided with electrically connecting members for electrically connecting electrode terminals of the unit cells with each other and/or electrically connecting an external device to the electrode terminals, the electrically connecting members being integrally formed at the housing member.

BACKGROUND OF THE INVENTION

Recently, a secondary battery, which can be charged and discharged, has been widely used as an energy source for wireless mobile devices. Also, the secondary battery has attracted considerable attention as a power source for electric vehicles and hybrid electric vehicles, which have been developed to solve problems, such as air pollution, caused by existing gasoline and diesel vehicles using fossil fuel.

Small-sized mobile devices use one or several small-sized cells for each device. On the other hand, medium- or large-sized devices, such as vehicles, use a medium- or large-sized battery module having a plurality of cells electrically connected with each other because high output and large capacity are necessary for the medium- or large-sized devices.

Generally, a battery module is manufactured by electrically connecting a plurality of battery cartridges, each of which has a plurality of unit cells connected in series and/or parallel with each other. According to circumstances, two or more battery modules are electrically connected with each other to provide a medium- or large-sized battery system having higher output.

Consequently, there is needed a connecting member that is capable of effectively performing the electrical connection between the unit cells, the electrical connection between the cartridges, and the electrical connection between the battery modules, which are necessary to form a high-output and large-capacity power source, the electrical connection for receiving power from the battery modules and supplying the power to an external device, and the connection to a system to control the operation of the batteries. Furthermore, the high-output and large-capacity battery module generates a large amount of heat during the charge and discharge of the battery. If the heat is not efficiently removed, the heat is accumulated, which leads to the degradation of the unit cells. Consequently, a cooling system is essentially required.

In the course of manufacturing the high-output and large-capacity battery module, a plurality of members are used. Consequently, the total manufacturing costs of the battery module are decided depending upon the manufacturing costs of the members, the degree of difficulty in the assembly process of the members, and the time necessary to assemble the members.

Furthermore, when the successive connection of electrical connecting members is not accomplished due to a mistake of an engineer in the course of assembling the electrical connecting members, short circuits may occur, which leads to defective unit cells. As such, eventually, the manufacturing costs of the battery module are increased.

SUMMARY OF THE INVENTION

Therefore, the present invention has been made to solve the above problems, and other technical problems that have yet to be resolved.

Specifically, it is an object of the present invention to integrate electrically connecting members with a housing member, which is one of the principal members constituting a battery module, thereby reducing the manufacturing costs of the members and improving the assembly process of the battery module.

It is another object of the present invention to provide a battery module including the housing member, whereby the assembly process and the cooling efficiency of the battery module are greatly improved.

In accordance with one aspect of the present invention, the above and other objects can be accomplished by the provision of a housing member for a battery module, which is mounted to at least one side of the battery module such that a flow channel of refrigerant is defined in the battery module having unit cells stacked therein, wherein the housing member is provided with electrically connecting members for electrically connecting electrode terminals of the unit cells with each other and/or electrically connecting an external device to the electrode terminals, the electrically connecting members being integrally formed at the housing member.

Consequently, the housing member according to the present invention is manufactured in a structure in which the electrically connecting members are integrally formed at the housing member. Consequently, the manufacturing costs of the housing member are reduced. Furthermore, the assembly process of the battery module is greatly simplified, and the occurrence of short circuits caused by an engineer's mistake is effectively prevented.

The outer surfaces of the unit cells or the outer surfaces of the cartridges having the unit cells are mounted therein are covered by the housing member, whereby the refrigerant flows along only predetermined flow channels. The housing member may be manufactured in the shape of a single body such that the outer surfaces of the cartridges can be covered by the single-body housing member. Alternatively, two or more unit members are prepared and assembled to constitute the housing member such that the outer surfaces of the cartridges can be covered by the assembled housing member. The present invention is characterized in that the members for electrically connecting the electrode terminals of the unit cells, preferably, the electrode terminals of the cartridges, (the electrically connecting members) are integrally formed with the housing member at predetermined positions.

In a preferred embodiment, the unit cells are stacked one on another while the unit cells are mounted in each cartridge, the electrode terminals protrude from opposite ends of each cartridge, and the housing member is mounted to the side of the battery module where the electrode terminals are arranged while the cartridges are stacked one on another. In this structure, the electrically connecting members are located at opposite ends of the housing member.

The electrically connecting members are not particularly restricted so long as the electrical connection between the electrode terminals of the unit cells and/or the electrical connection between the external devices and the corresponding electrode terminals are accomplished by the electrically connecting members, and the electrically connecting members are integrally formed at the housing member.

In a preferred embodiment, each of the electrically connecting members comprises: an electrically insulating hollow connecting member body having an open upper end; and an electrically insulating cover coupled to the open upper end of the connecting member body. Also, each of the electrically connecting members is constructed such that a plate-shaped conductive bus bar is mounted to the lower end of the connecting member body, two or more terminal insertion holes are formed in the lower end of the connecting member body and the bus bar, the terminal insertion holes formed in the lower end of the connecting member body communicating with the terminal insertion holes formed in the bus bar, and a connecting member insertion slit is formed in one side of connecting member body for allowing further connection of the corresponding electrode terminal to an external connecting member, if necessary. A preferred example of the electrical connecting member is disclosed in Korean Patent Application No. 2005-32503, which has been filed in the name of the applicant of the present patent application. According to the disclosure of the above-mentioned patent application, the electrical connection is easily accomplished by the electrical connecting member, and the terminal connection part is isolated from the outside by the insulation body, whereby occurrence of short circuits and occurrence of corrosion due to moisture are effectively prevented. The disclosure of the above-mentioned patent application is hereby incorporated by reference as if fully set forth herein.

For example, the housing member is made of an electrically insulating material or is coated with an electrically insulating material, whereby short circuits between the housing member and the components of the battery module, including the unit cells, are effectively prevented. The housing member serves to protect the unit cells (or the cartridges having the unit cells mounted therein) in addition to the provision of the refrigerant channels for the battery module. In a preferred embodiment, in the case that the battery module is constructed by stacking cartridges, each of which has two or more unit cells mounted therein, one on another, the unit cells are arranged in several rows depending upon the number of the unit cells mounted in each cartridge. Preferably, the housing member may have compartment defined therein such that refrigerant channels are formed by cell groups, which are unit cells arranged in the respective rows.

According to the present invention, the housing member and the electrically connecting members are integrally formed to constitute a single body. For example, the housing member and the electrically connecting members may be manufactured by injection molding of a plastic resin. In this case, the other parts of the electrically connecting members except the conductive terminal connection parts are integrally formed with the housing member by the injection molding.

In accordance with another aspect of the present invention, there is provided a medium- or large-sized battery module having the housing member as described above.

In the medium- or large-sized battery module according to the present invention, the unit cells are connected in series and/or parallel with each other by the electrically connecting members integrally formed at the housing member. Since the electrically connecting members are integrally formed at the housing member, the assembly process of the battery module is greatly simplified, and the occurrence of short circuits caused by an engineer's mistake during the assembly of the battery module is effectively prevented.

Generally, the medium- or large-sized battery module is constructed such that a plurality of unit cells are stacked one on another with high density. The unit cells are stacked one on another such that the neighboring unit cells are spaced a predetermined distance from each other, whereby heat generated during the charge and discharge of the battery is effectively removed. Preferably, one unit cell or more than one unit cell having low mechanical rigidity is mounted in a cartridge, and a plurality of cartridges are stacked one on another to constitute a battery module. A preferred example of such cartridges is disclosed in Korean Patent Application No. 2004-81657, which has been filed in the name of the applicant of the present patent application. According to the disclosure of the above-mentioned patent application, when the cartridges are stacked one on another while the cartridges are connected with each other, the stacked unit cells are spaced a predetermined distance from each other such that flow channels of refrigerant are defined between the stacked unit cells. The disclosure of the above-mentioned patent application is hereby incorporated by reference as if fully set forth herein.

The refrigerant is a substance having no effect on the operations of the unit cells and other components of the battery module. Preferably, the refrigerant may be air. The refrigerant is introduced from one side of the battery module, passes through between the unit cells, and is then discharged to the other side of the battery module, whereby heat generated from the unit cells during the charge and discharge of the unit cells is effectively removed.

In a preferred embodiment, an inlet port for allowing the refrigerant to be introduced therethrough and an outlet port for allowing the refrigerant to be discharged therethrough are located on the same plate of the battery module, and the flow channel of refrigerant between the inlet port and the outlet port is divided such that the refrigerant introduced through the inlet port cools specified cell groups and is then discharged through the outlet port. A preferred example of such cooling system is disclosed in Korean Patent Application No. 2004-85765, which has been filed in the name of the applicant of the present patent application. According to the disclosure of the above-mentioned patent application, the refrigerant inlet port and the refrigerant outlet port are located on the same plate of the battery module, whereby the total size of the system is minimized. Also, the refrigerant channel is divided, whereby uniform refrigerant supply is accomplished. Consequently, heat generated from the unit cells is effectively removed, and the temperature difference between the unit cells is minimized during the cooling process. The disclosure of the above-mentioned patent application is hereby incorporated by reference as if fully set forth herein.

When the battery module is constructed, the unit cells may be arranged in various structures. Preferably, the cartridges each having the unit cells mounted therein may be successively stacked one on another. For example, the cartridges may be stacked one on another in such a manner that the electrode terminal of a second cartridge disposed adjacent to a first cartridge is oriented by more than 90 degrees, preferably 180 degrees, with respect to the electrode terminal of the first cartridge, and the electrode terminal of a third cartridge disposed adjacent to the second cartridge is disposed in the same orientation as the electrode terminal of the first cartridge, the electrode terminal of the first cartridge is electrically connected with the electrode terminal of the third cartridge, the electrode terminal of the second cartridge is electrically connected with the electrode terminal of a fourth cartridge, and the electrode terminal of the last cartridge is electrically connected with the electrode terminal of a cartridge adjacent to the last cartridge. An example of this structure is disclosed in Korean Patent Application No. 2004-92887, which has been filed in the name of the applicant of the present patent application. According to the disclosure of the above-mentioned patent application, the distance between the electrode terminals, which are electrically connected with each other, and the gap between the terminal connecting parts are increased by the thickness of at least one of the cartridges, whereby the connection of the electrode terminals is easily performed, and interference between the connecting members is effectively prevented. Furthermore, the terminal connecting parts are not clustered together at one side of the battery pack, whereby a risk of an engineer receiving an electric shock is greatly reduced. The disclosure of the above-mentioned patent application is hereby incorporated by reference as if fully set forth herein.

The battery module according to the present invention may be used for a high-output and large-capacity energy source. Preferably, the battery module may be used for a power source for electric vehicles or hybrid electric vehicles.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF MAIN REFERENCE
NUMERALS OF THE DRAWINGS

| 100: battery module | 200: cartridges |
|---|---|
| 300: unit cell | 400: electrically connecting members |
| 500: housing member | 600: refrigerant circulating member |
| 700: frame | |

DETAILED DESCRIPTION OF PREFERRED
EMBODIMENTS

Now, preferred embodiments of the present invention will be described in detail with reference to the accompanying drawings. It should be noted, however, that the scope of the present invention is not limited by the illustrated embodiments.

Figure 1:
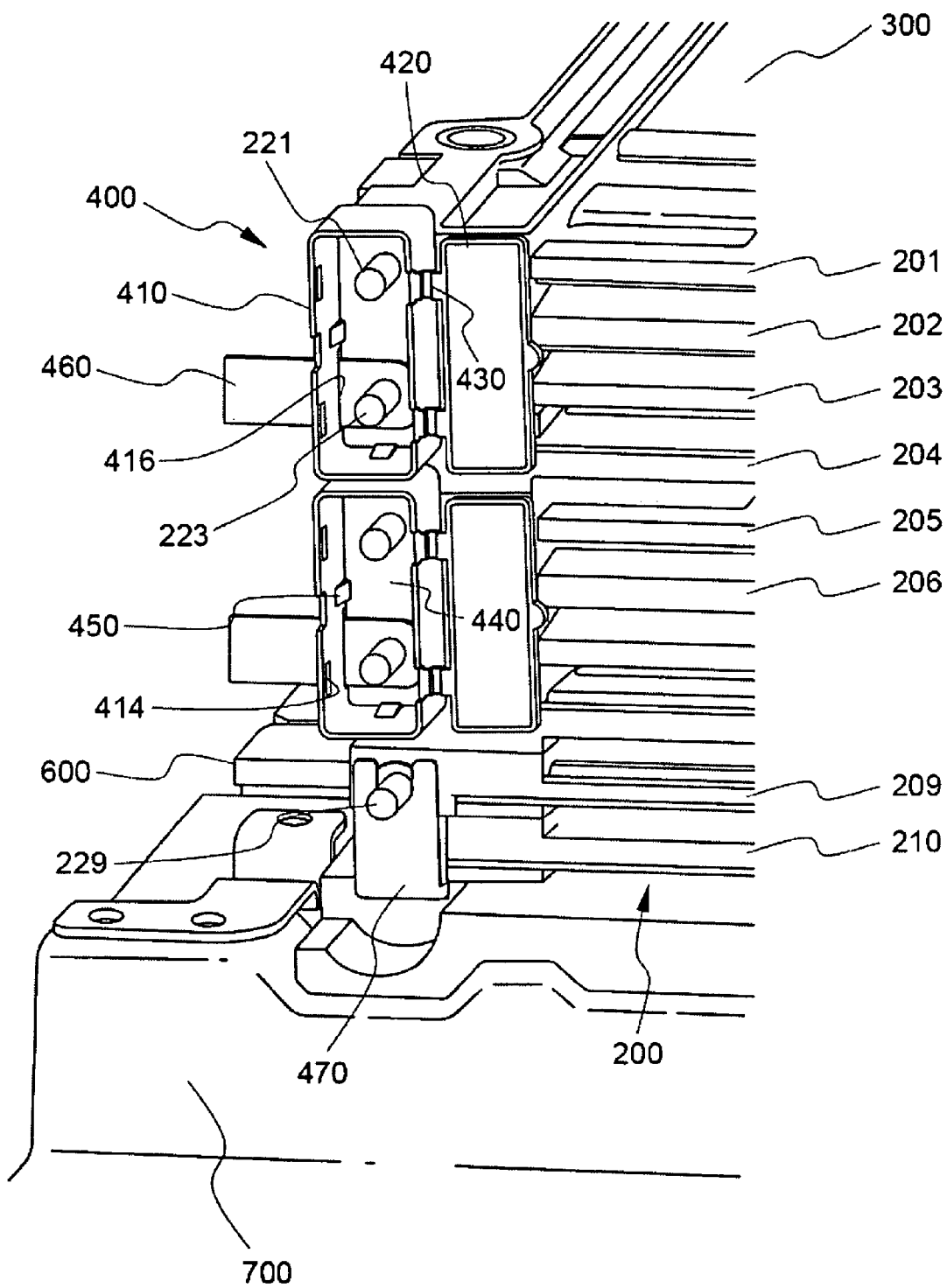
FIG. 1 is a perspective view illustrating the mounted state of electrically connecting members of a housing member according to a preferred embodiment of the present invention, the housing member being omitted for convenience of clear understanding and description.

FIG. 1 is a perspective view illustrating the mounted state of electrically connecting members of a housing member according to a preferred embodiment of the present invention. For convenience of clear understanding and description, only the electrically connecting members of the housing member are shown in the drawing.

Referring to FIG. 1, a battery module 100 comprises: cartridges 200 each having unit cells 300 mounted therein; electrically connecting members 400 for connecting electrode terminals of the cartridges 200 in series with each other; a refrigerant circulating member 600 mounted below the lowermost one of the cartridges 200; and a frame 700 for allowing the cartridges 200, the electrically connecting members 400, and the refrigerant circulating member 600 to be mounted thereon.

A plurality of unit cells 300 are mounted in each of the cartridges 200, the number of which is ten as shown in FIG. 1. The ten cartridges 200 are stacked one on another in an alternate 180-degree orientation manner. Specifically, a first one of the cartridges 200, i.e., a first cartridge 201, is disposed such that an electrode terminal 221 of the first cartridge 201 is located at the front part of the first cartridge 201. A second one of the cartridges 200, i.e., a second cartridge 202, which is adjacent to the first cartridge 201, is disposed below the first cartridge 201 such that an electrode terminal (not shown) of the second cartridge 202 is located at the rear part of the second cartridge 202. A third one of the cartridges 200, i.e., a third cartridge 203, which is adjacent to the second cartridge 202, is disposed below the second cartridge 202 such that an electrode terminal 223 of the third cartridge 203 is located at the front part of the third cartridge 203. That is to say, the odd cartridges 201, 203, 205 . . . are arranged such that the electrode terminals of the odd cartridges are located at the front parts of the odd cartridges, and the even cartridges 202, 204, 206 . . . are arranged such that the electrode terminals of the even cartridges are located at the rear parts of the even cartridges. As a result, the distance between the electrode terminals is increased by the thickness of at least one of the cartridges 200. Consequently, the connection of the electrode terminals is easily performed, and interference between the electrically connecting members is effectively prevented.

Although FIG. 1 illustrates the series electrical connection, it is possible that the electrode terminal 221 of the first cartridge 201 and the electrode terminal 223 of the first cartridge 203 are arranged in the same electrode structure, whereby the parallel electrical connection is easily accomplished.

The electrically connecting member 400 mounted to the electrode terminals 221 and 223 comprises: a box-shaped connecting member body 410 having an open upper end; and a cover 420 hingedly connected to one side of the open upper end of the connecting member body 410 via a pair of hinges 430.

To the lower end of the connecting member body 410 is mounted a plate-shaped conductive bus bar 440. In the lower end of the connecting member body 410 are formed two terminal insertion holes 412 (see FIG. 3). Also, two terminal insertion holes 442 (see FIG. 3) are formed in the bus bar 440 such that the terminal insertion holes 442 formed in the bus bar 440 communicate with the terminal insertion holes 412 formed in the lower end of the connecting member body 410, respectively. As a result, the electrode terminals 221 and 223 are inserted into the connecting member body 410 through the terminal insertion holes 412 formed in the lower end of the connecting member body 410 and the terminal insertion holes 442 formed in the bus bar 440.

The bus bar is stably fixed to the lower end of the connecting member body 410 by means of fixing protrusions 450 formed at the inside surface of the connecting member body 410. Each of the fixing protrusions 450 is constructed in a downward-tapered structure. Consequently, the bus bar 440 can be easily pushed to the lower end of the connecting member body 410. However, once the bus bar 440 is mounted to the lower end of the connecting member body 410, it is very difficult to separate the bus bar 440 from the lower end of the connecting member body 410. The fixing protrusions 450 are located at four positions of the inside surface of the connecting member body 410.

The cover 420 has a size sufficient to completely cover the open upper part of the connecting member body 410. The cover 420 is stably coupled to the connecting member body 410 by the engagement of coupling protrusions (not shown) of the cover 420 in coupling grooves 414 formed at the side surface of the connecting member body 410, respectively.

Each electrically connecting member 400 is used in the case that an external connecting member 460 is electrically connected to the corresponding electrode terminal not only for the connection between the electrode terminals but also for the detection of voltage necessary to control the battery or the electrical connection between the battery modules. For this reason, a connecting member insertion slit 416 is formed in the side of each connecting member body 410. The external connecting member 460 is constructed in a plate-shaped strip structure. In the external connecting member 460 is formed a connection hole (not shown in the drawing because the corresponding electrode terminal is inserted through the connection hole) corresponding to the size of the electrode terminal. Consequently, when the external connecting member 460 is to be connected to the corresponding electrode terminal by the electrically connecting member 400, the external connecting member 460 is mounted to the electrically connecting member 400, and then the electrically connecting member 400 is located at the corresponding electrode terminals 221 and 223.

The electrode terminal of a ninth one of the cartridges 200, i.e., a ninth cartridge 209, is electrically connected to the electrode terminal (not shown) of a tenth one of the cartridges 200, i.e., a tenth cartridge 210.

Figure 2:
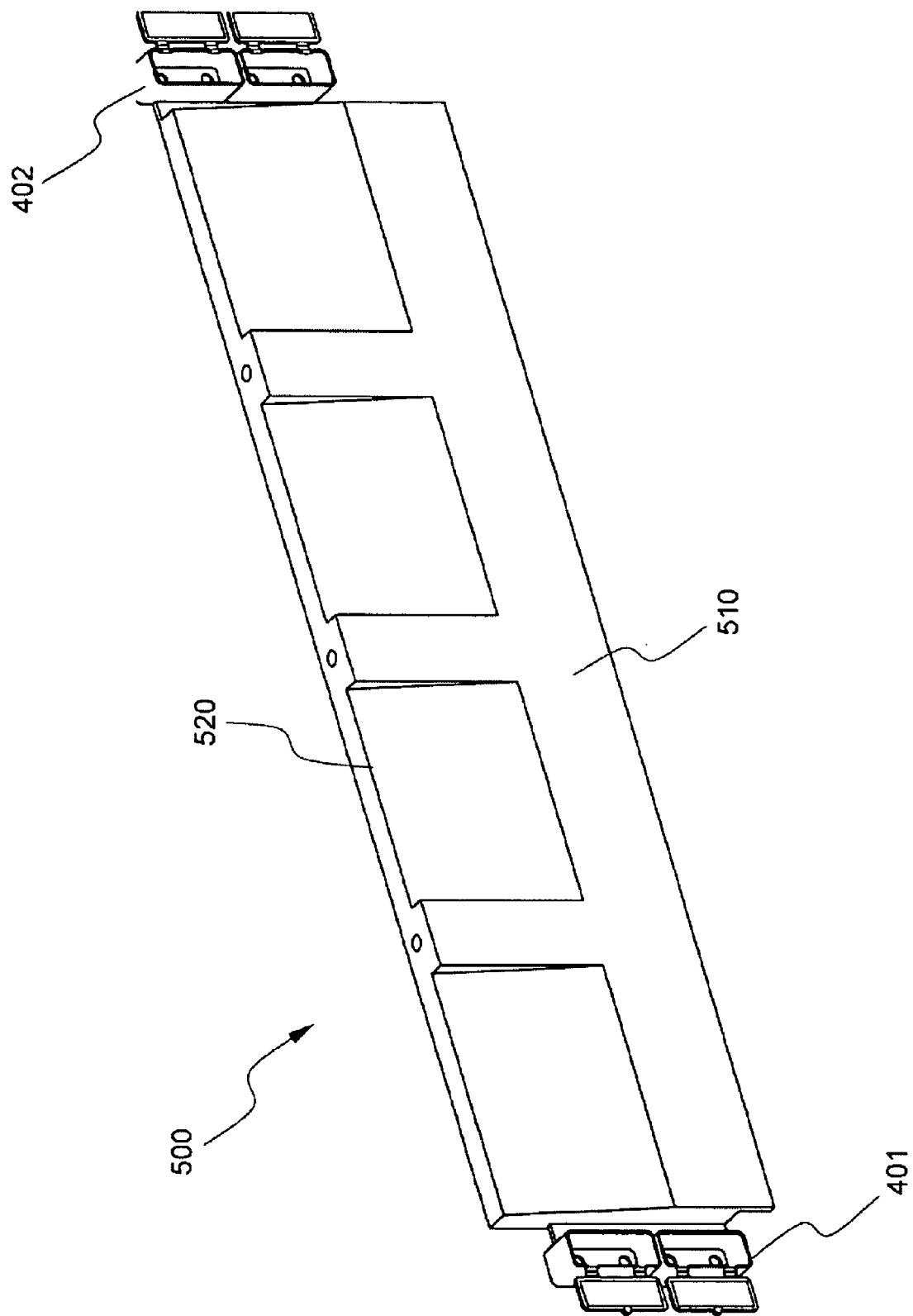
FIG. 2 is a front view illustrating a housing member according to a preferred embodiment of the present invention.
Figure 3:
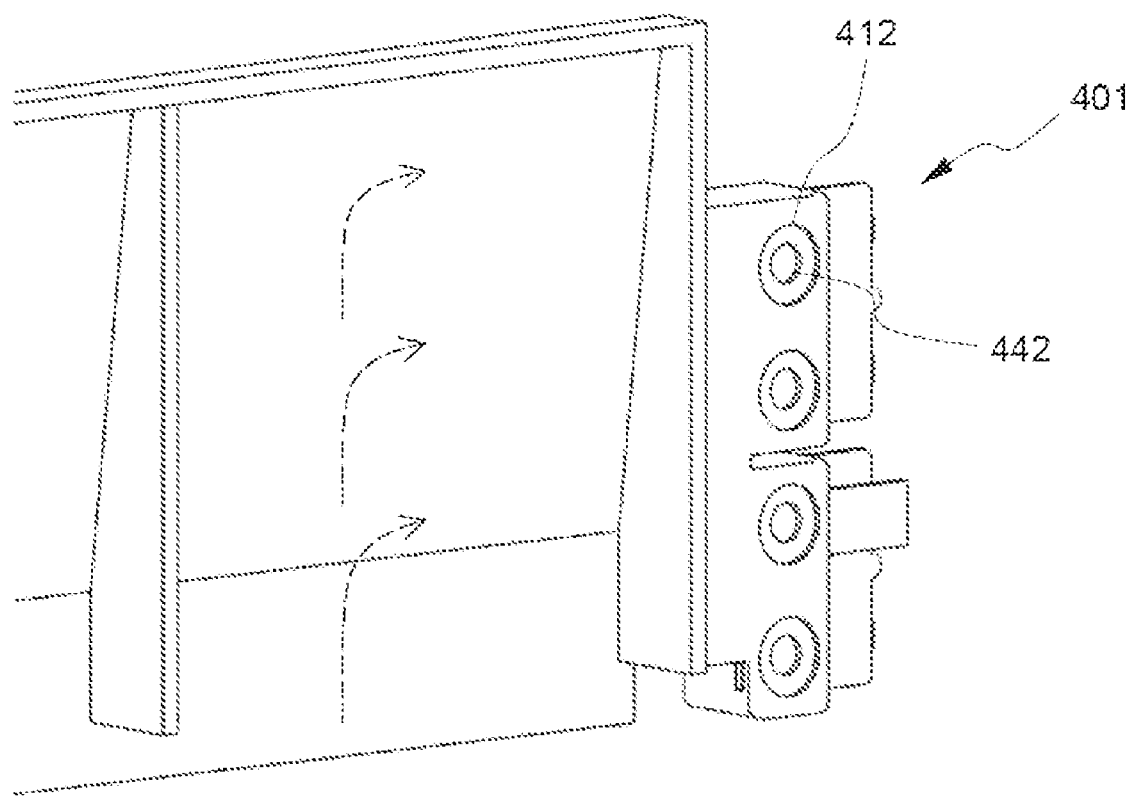
FIG. 3 is a partial perspective view of the housing member shown in FIG. 2 illustrating the rear part of the housing member.

FIGS. 2 and 3 illustrate, in a front view and a partial perspective view, the front part and the rear part of a housing member according to a preferred embodiment of the present invention, respectively.

Referring to these drawings, the housing member 500 comprises: a rectangular housing member body 510; and a plurality of terminal connecting members 401 and 402 integrally formed at opposite ends of the housing member body 510. The housing member body 510 has a plurality of compartments divided by partitions 512 formed vertically at the inside thereof such that the refrigerant channel of the stacked cartridges (not shown) constituting the battery module can be divided for each cell group. The compartments 520 are inclined in the flow direction of the refrigerant. For example, as indicated by arrows in FIG. 3, the refrigerant moves upward along the inside surface of the compartments 520 such that the refrigerant can be introduced between the cartridges (not shown) in the directions of the arrows.

The number of the terminal connecting members 401 and 402 integrally formed at the opposite ends of the housing member body 510 is decided based on the number of the stacked cartridges. In the case that the ten cartridges are stacked one on another such that the cartridges can be electrically connected in series with each other in the alternate orientation manner as shown in FIG. 1, two terminal connecting members 401 and 402 are necessary for each end of the housing member body 510, and the terminal connecting members 401 at the left end of the housing member body 510 and the terminal connecting members 402 at the right end of the housing member body 510 are not located on the same plane. Consequently, the occurrence of short circuits caused by an engineer's incorrect connection of the electrode terminals during the assembly of the battery module is effectively prevented.

Preferably, the terminal connecting members 401 and 402 and the housing member body 510 are manufactured by injection molding of a plastic resin. During the assembly of the battery module, the terminal connecting members 401 and 402 and the housing member body 510 are mounted to the cartridges in the electrode terminal direction of the cartridges at the same time. Consequently, the manufacturing process and the assembly process are greatly simplified.

Figure 4:
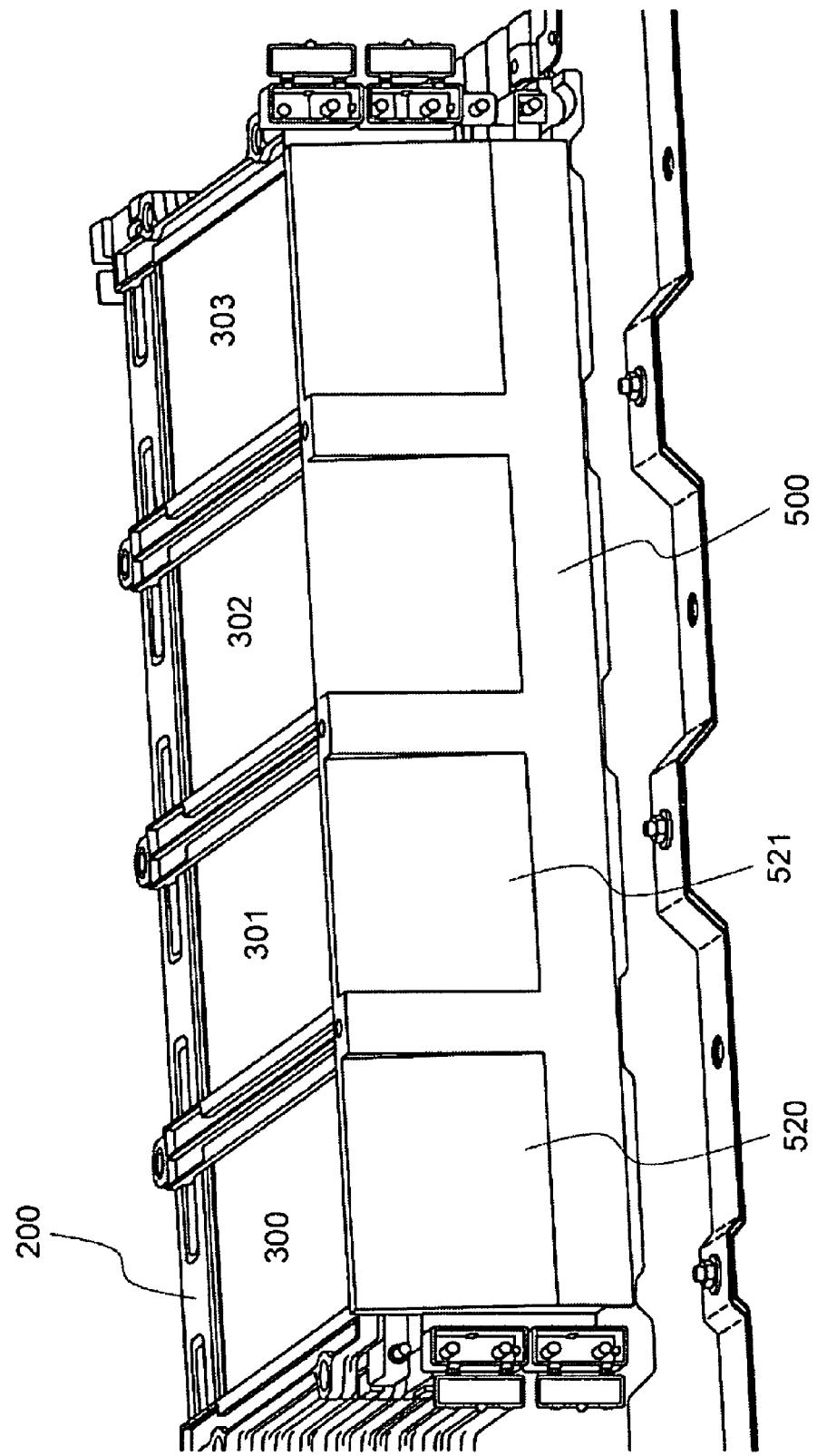
FIG. 4 is a partial perspective view illustrating a battery module, to which only the housing member shown in FIG. 3 is mounted.
Figure 5:
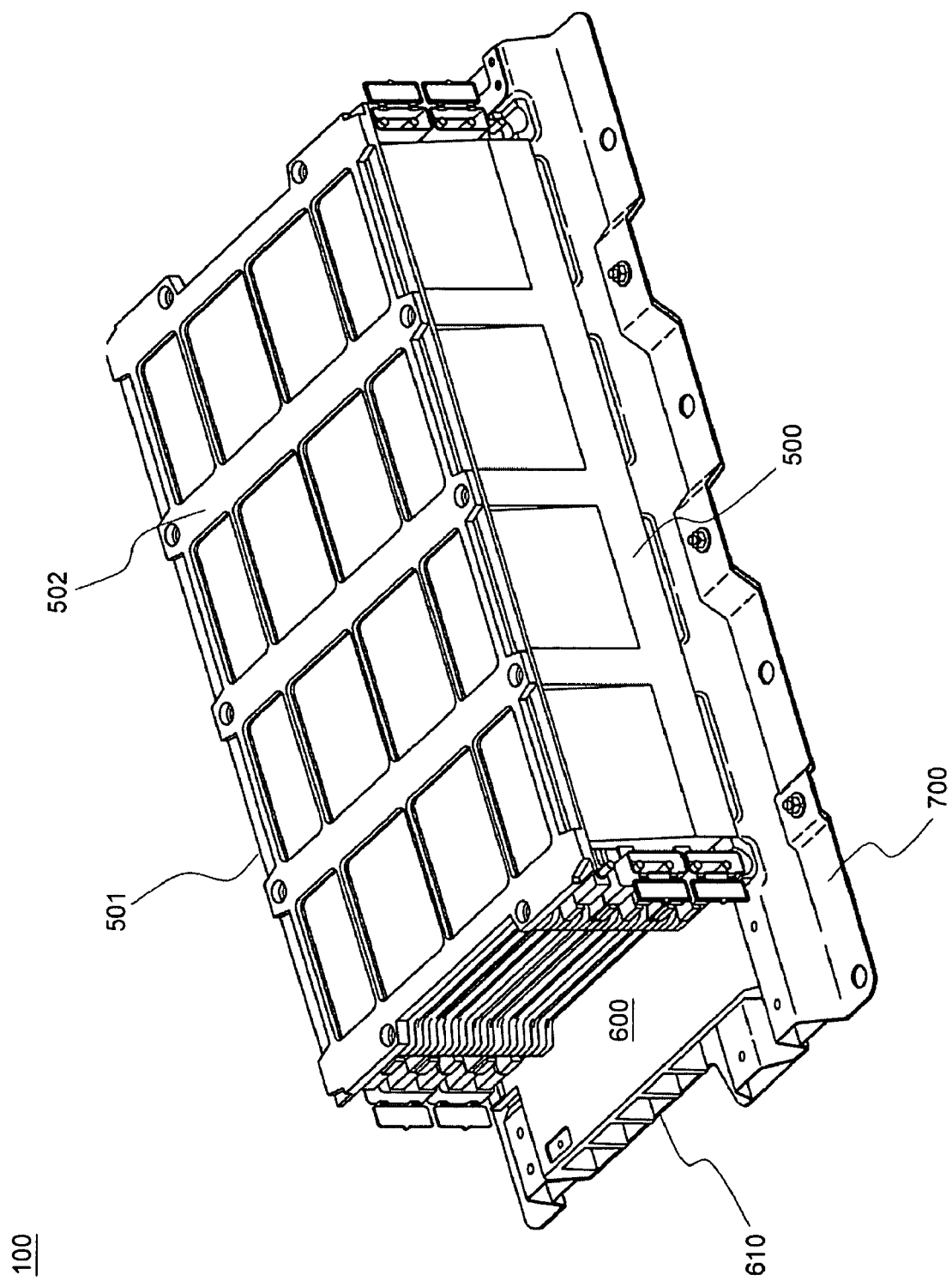
FIGS. 5 to 8 are an entire perspective view, partial perspective views, and a front view illustrating a battery module with housing members being mounted to three sides of cartridges.
Figure 6:
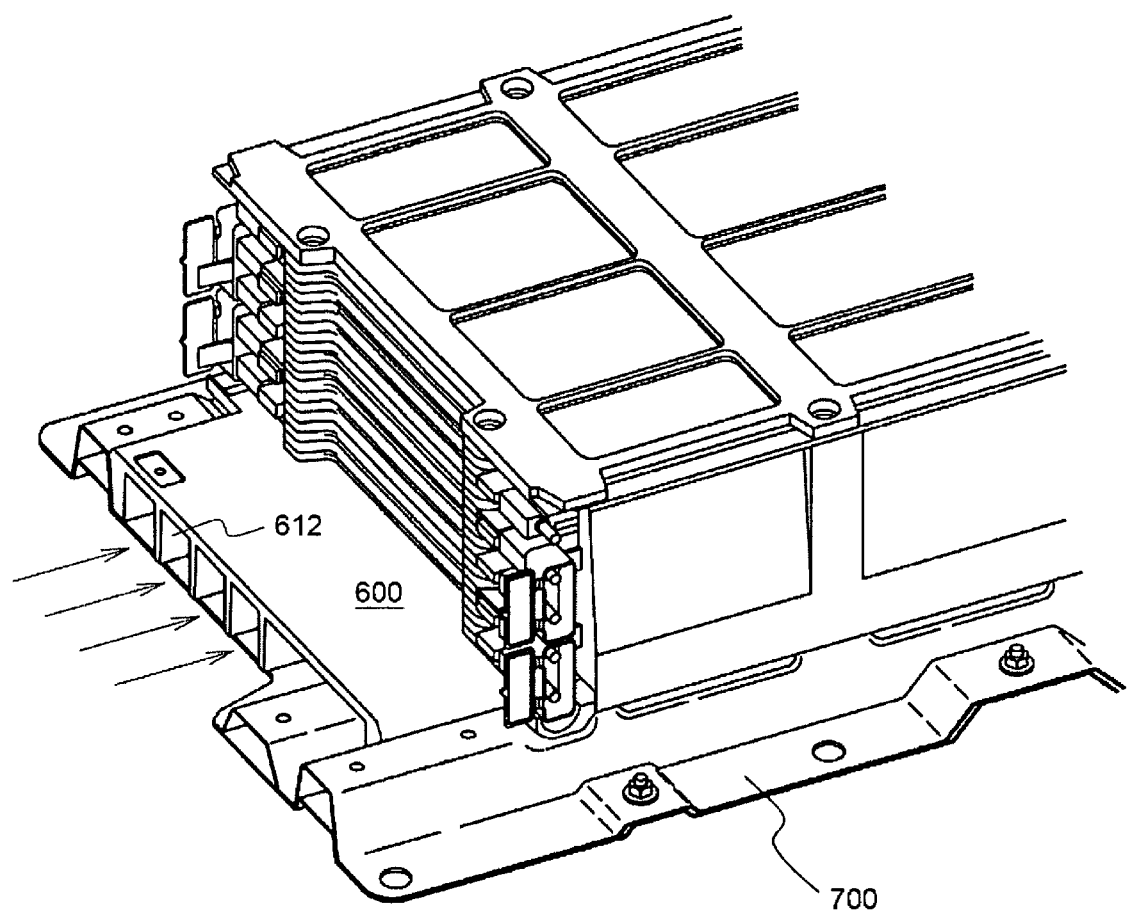
Figure 7:
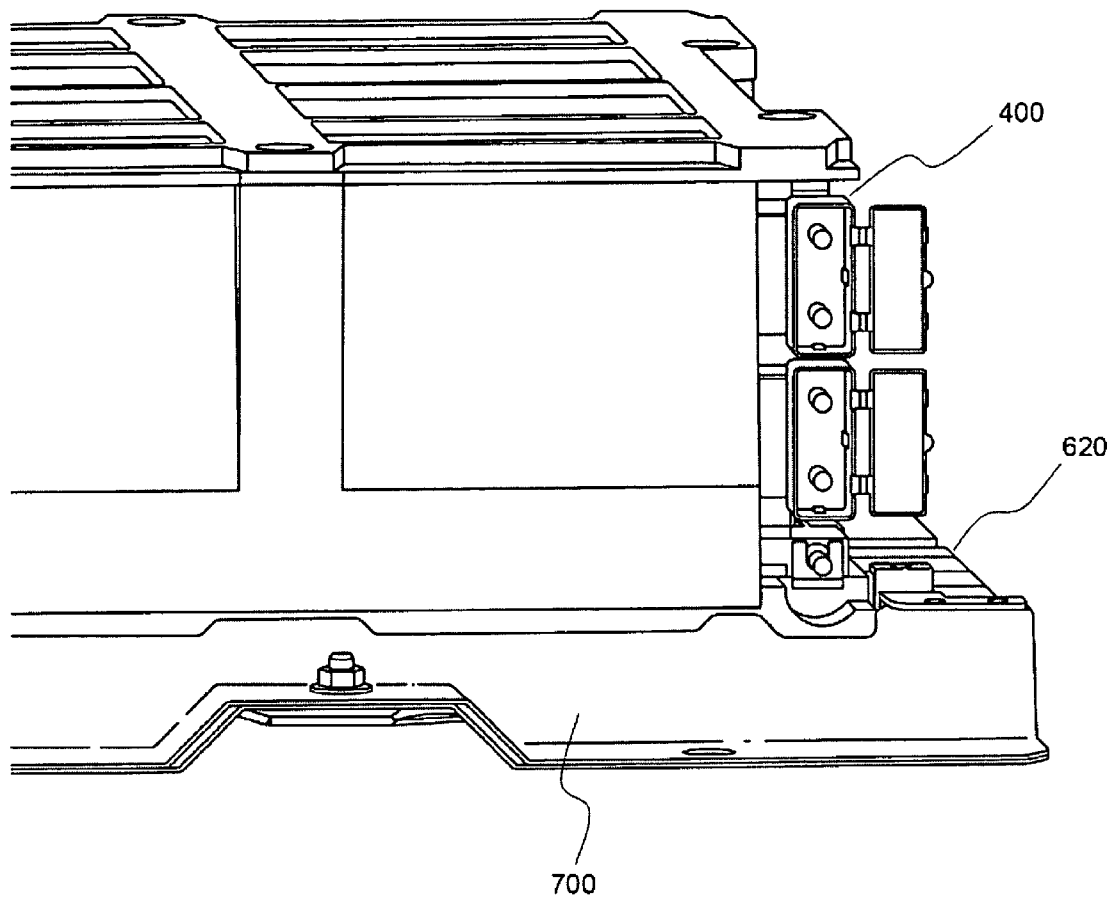
Figure 8:
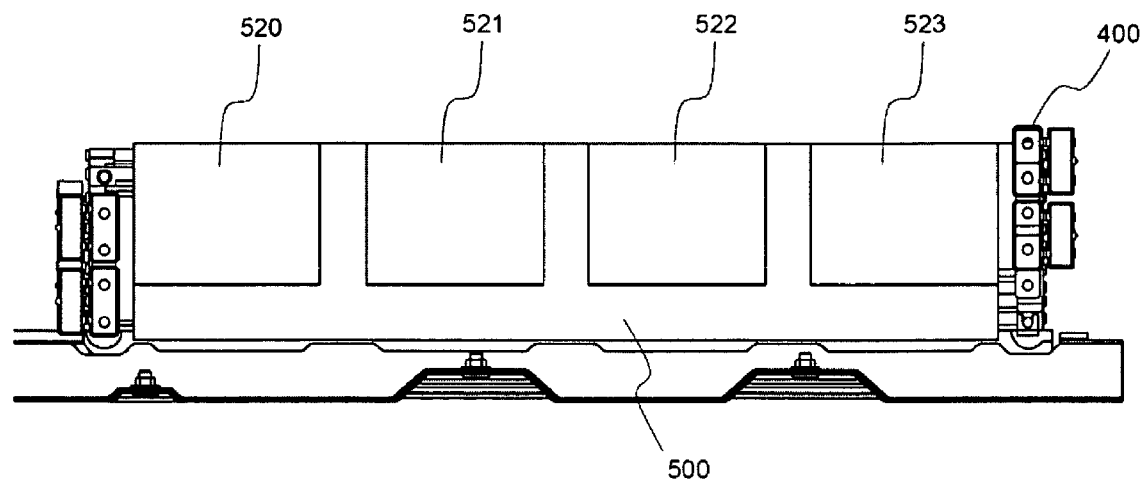

FIG. 4 is a partial perspective view illustrating a battery module, to which only the housing member shown in FIG. 3 is mounted.

Referring to FIG. 4, a plurality of cartridges 200, each of which has four unit cells 300, 301, 302, and 303 electrically connected with each other, are stacked one on another in an alternate orientation manner. The housing member 500 is mounted at the side of the stacked cartridges 200 where the electrode terminals 220 of the cartridges 200 protrude. Consequently, one side of the stacked cartridges 200 is sealed by the housing member 500, and refrigerant channels are defined between the side of the stacked cartridges 200 and the housing member 500. The refrigerant channel for a cell group comprising the unit cells 300 (a cell group comprising the unit cells 300 of the stacked cartridges 200, which are arranged vertically in a row) is divided from the refrigerant channel of the neighboring compartment 521 by the compartment 520 of the housing member 500. Specifically, the refrigerant of the cell group comprising the unit cells 300 passes through only the compartment 520, and the refrigerant of a cell group comprising the neighboring unit cells 301 (a cell group comprising the unit cells 301 of the stacked cartridges 200, which are arranged vertically in a row) passes through only the compartment 521. The details thereof are described in the previously mentioned Korean Patent Application No. 2004-85765.

FIGS. 5 to 8 are an entire perspective view, partial perspective views, and a front view illustrating a battery module with the housing members being mounted to three sides of the stacked cartridges.

Referring to these drawings, three sides of the cartridges 200, which are stacked one on another in an alternate orientation manner, are sealed by a front housing member 500, a rear housing member 501, and a top housing member 502. Air, as the refrigerant, is introduced from the refrigerant circulating member 600 disposed below the lowermost one of the cartridges 200, i.e., between the frame 700 and the lowermost one of the cartridges 200 (see arrows), passes through between the cartridges 200 in the inner space sealed by the housing members 500, 501, and 502, and is then discharged in the opposite direction.

In an inlet port 610 of the refrigerant circulating member 600 are formed a plurality of partitions 612, which divides the flow channel of the refrigerant. The refrigerant divided by the partitions 612 is further divided by the compartments 520, 521, 522, and 523 of the housing member body 510, and is then circulated. Consequently, more uniform cooling effect is accomplished. The refrigerant circulating member 600 has an outlet 620, which is located on the same plane as the inlet port 610, whereby it is possible to reduce the total size of the battery module.

Although the electrically connecting members 400 are integrally formed at the front housing member 500 and the rear housing member 501, the positions of the electrically connecting members 400 and the inclined directions of the partitions 520 at the housing members 500 and 501 may be different. Meanwhile, although the three housing members 500, 501, and 502 are separately prepared and assembled as shown in the drawings, either the front housing member 500 and the rear housing member 501 or the rear housing member 501 and the top housing member 502 may be integrally formed to constitute a single body according to circumstances. Alternatively, the three housing members 500, 501, and 502 may be integrally formed to constitute a single body. In the case that some or all of the housing members 500, 501, and 502 are integrally formed to constitute a single body as described above, it is preferable to form connection parts of the housing members in an easily bendable structure.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the housing member according to the present invention is manufactured in a structure in which the electrically connecting members are integrally formed at the housing member. Consequently, the manufacturing costs of the housing member are reduced. Furthermore, the assembly process of the battery module is greatly simplified, and the occurrence of short circuits caused by an engineer's mistake is effectively prevented.

What is claimed is:

1. A housing member for a battery module, which is mounted to at least one side of the battery module such that a flow channel of refrigerant is defined in the battery module having unit cells stacked therein, wherein
the housing member includes a rectangular housing member body and first and second electrically connecting members integrally formed on first and second ends, respectively, of the rectangular housing member body, the first and second electrically connecting members configured to electrically connect electrode terminals of the unit cells with each other and/or to electrically connect an external device to the electrode terminals;
the battery module is constructed of stacked cartridges, each of which has two or more unit cells mounted therein, one on another, the unit cells are arranged in several rows depending upon a number of the unit cells mounted in each cartridge;
the rectangular housing member body has wedge-shaped compartments extending therein that are divided by partitions extending vertically on the housing member body, each wedge-shaped compartment being disposed proximate to a corresponding unit cell group, and the wedge-shaped compartments are inclined in the flow direction of the refrigerant such that the refrigerant moves upward along an inside surface of the compartments and then the refrigerant is introduced between the cartridges.

2. The housing member according to claim 1, wherein the unit cells are stacked one on another while one unit cell or more than one unit cell is mounted in each cartridge, the electrode terminals protrude from opposite ends of each cartridge, and the housing member is mounted to the side of the battery module where the electrode terminals are arranged while the cartridges are stacked one on another.

3. The housing member according to claim 1, wherein each of the electrically connecting members comprises:

an electrically insulating hollow connecting member body having an open upper end; and
an electrically insulating cover coupled to the open upper end of the connecting member body,
wherein each of the electrically connecting members are constructed such that a plate-shaped conductive bus bar is mounted to the lower end of the connecting member body; two or more terminal insertion holes are formed in the lower end of the connecting member body and the bus bar, the terminal insertion holes formed in the lower end of the connecting member body communicating with the terminal insertion holes formed in the bus bar; and a connecting member insertion slit is formed in one side of connecting member body for allowing further connection of the corresponding electrode terminal to an external connecting member, if necessary.

4. The housing member according to claim 1, wherein the housing member is made of an electrically insulating material or is coated with an electrically insulating material.

5. The housing member according to claim 4, wherein the housing member and the electrically connecting members are manufactured by one-time injection molding of a plastic resin.

6. A battery module having the housing member according to claim 1.

7. The battery module according to claim 6, wherein unit cells are stacked one on another while one unit cell or more than one unit cell is mounted in each cartridge, a plurality of cartridges are stacked one on another, and flow channels of refrigerant are defined between the stacked cartridges.

8. The battery module according to claim 7, wherein the refrigerant is air.

9. The battery module according to claim 6, wherein an inlet port for allowing the refrigerant to be introduced therethrough and an outlet port for allowing the refrigerant to be discharged therethrough are located on the same plate of the battery module, and the flow channel of refrigerant between the inlet port and the outlet port is divided such that the refrigerant introduced through the inlet port cools specified cell groups and is then discharged through the outlet port.

10. The battery module according to claim 6, wherein unit cells are stacked one on another while one unit cell or more than one unit cell is mounted in each cartridge, a plurality of cartridges are stacked one on another in such a manner that the electrode terminal of a second cartridge disposed adjacent to a first cartridge is oriented by 180 degrees with respect to the electrode terminal of the first cartridge, and the electrode terminal of a third cartridge disposed adjacent to the second cartridge is disposed in the same orientation as the electrode terminal of the first cartridge, the electrode terminal of the first cartridge is electrically connected with the electrode terminal of the third cartridge, the electrode terminal of the second cartridge is electrically connected with the electrode terminal of a fourth cartridge, and the electrode terminal of the last cartridge is electrically connected with the electrode terminal of a cartridge adjacent to the last cartridge.

11. The battery module according to claim 6, wherein the battery module is used for electric vehicles or hybrid electric vehicles.

\* \* \* \* \*